(12) United States Patent
Carnevali

(10) Patent No.: US 8,792,234 B2
(45) Date of Patent: Jul. 29, 2014

(54) PORTABLE DEVICE DOCKING STATION

(76) Inventor: Jeffrey D. Carnevali, Seattle, WA (US)

( * ) Notice: Subject to any disclaimer, the term of this patent is extended or adjusted under 35 U.S.C. 154(b) by 218 days.

(21) Appl. No.: 13/285,213

(22) Filed: Oct. 31, 2011

(65) Prior Publication Data

US 2013/0107446 A1    May 2, 2013

(51) Int. Cl.
*G06F 1/16*    (2006.01)
*H05K 5/00*    (2006.01)
*H05K 7/00*    (2006.01)

(52) U.S. Cl.
USPC ................................. 361/679.43; 361/679.41

(58) Field of Classification Search
USPC .................... 361/600, 679.01, 679.02, 679.4, 361/679.41, 679.43
See application file for complete search history.

(56) References Cited

U.S. PATENT DOCUMENTS

| | | | | |
|---|---|---|---|---|
| 6,034,869 A * | 3/2000 | Lin | ........................... | 361/679.43 |
| 6,549,416 B2 * | 4/2003 | Sterner et al. | ................. | 361/727 |
| 7,283,357 B2 * | 10/2007 | Kim | ......................... | 361/679.41 |
| 7,633,750 B2 * | 12/2009 | Fan et al. | ................. | 361/679.43 |
| 8,098,488 B2 * | 1/2012 | Lewandowski et al. | . | 361/679.41 |
| 2002/0159231 A1 * | 10/2002 | Nguyen et al. | ................ | 361/686 |

* cited by examiner

*Primary Examiner* — Bernard Rojas
(74) *Attorney, Agent, or Firm* — Charles J. Rupnick

(57) ABSTRACT

A docking station formed of a tray having a clamping portion coupled to a receiver portion for motion along a travel axis therebetween. A lever is coupled for moving the clamping portion between an expanded position spaced away from the receiver portion, and a retracted position adjacent to the receiver portion. The lever includes a preload portion that is adapted for preloading the clamping portion in the retracted position, and a latching portion that is coupled for retaining the clamping portion in the retracted position. The preload portion of the lever is a resiliently bendable member, such as a spring. Optionally, the lever is a second class lever.

20 Claims, 4 Drawing Sheets

PORTABLE DEVICE DOCKING STATION

FIELD OF THE INVENTION

The present invention relates generally to trays for holding portable devices, and in particular to quick release docking stations for portable computers and other portable electronics devices having one or more input/output (I/O) communication ports.

BACKGROUND OF THE INVENTION

Portable electronic devices, such as laptop computers and other portable electronic devices, are generally equipped with connectors and ports for function expansion. Docking stations for portable laptop computers and other portable electronic device are generally well-known for providing such expanded capability through one or more connectors coupled, in turn, to auxiliary power and peripheral devices, such as a hard disk drive, mouse, printer, etc.

However, known docking station apparatus are limited in their ability to provide the above expansion efficiently and reliably.

SUMMARY OF THE INVENTION

According to one aspect of the invention the docking station is formed of a tray having a clamping portion coupled to a receiver portion for motion along a travel axis therebetween.

According to one aspect of the invention, a preload lever is coupled for moving the clamping portion between an expanded position spaced away from the receiver portion, and a retracted position adjacent to the receiver portion. The preload lever includes a preload portion that is adapted for preloading the clamping portion in the retracted position, and a latching portion that is coupled for retaining the clamping portion in the retracted position.

The preload lever has a fulcrum portion that is coupled to the receiver portion, a load portion that is coupled to the clamping portion, a resistance arm interconnecting the load portion and the fulcrum portion, and an effort arm that is coupled for driving the load portion relative to the fulcrum portion. Either the effort arm or the resistance arm includes the preload portion of the preload lever. The preload portion of the preload lever is a resiliently bendable member, such as a spring.

By example and without limitation, the preload lever is a second class lever.

Other aspects of the invention are detailed herein.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF PREFERRED EMBODIMENT

As required, a detailed illustrative embodiment of the present docking station is disclosed herein. However, techniques, systems and operating structures in accordance with the present docking station may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein which define the scope of the present docking station. The following presents a detailed description of an illustrative embodiment (as well as some alternative embodiments) of the present docking station.

In the Figures, like numerals indicate like elements.

Figure 3:
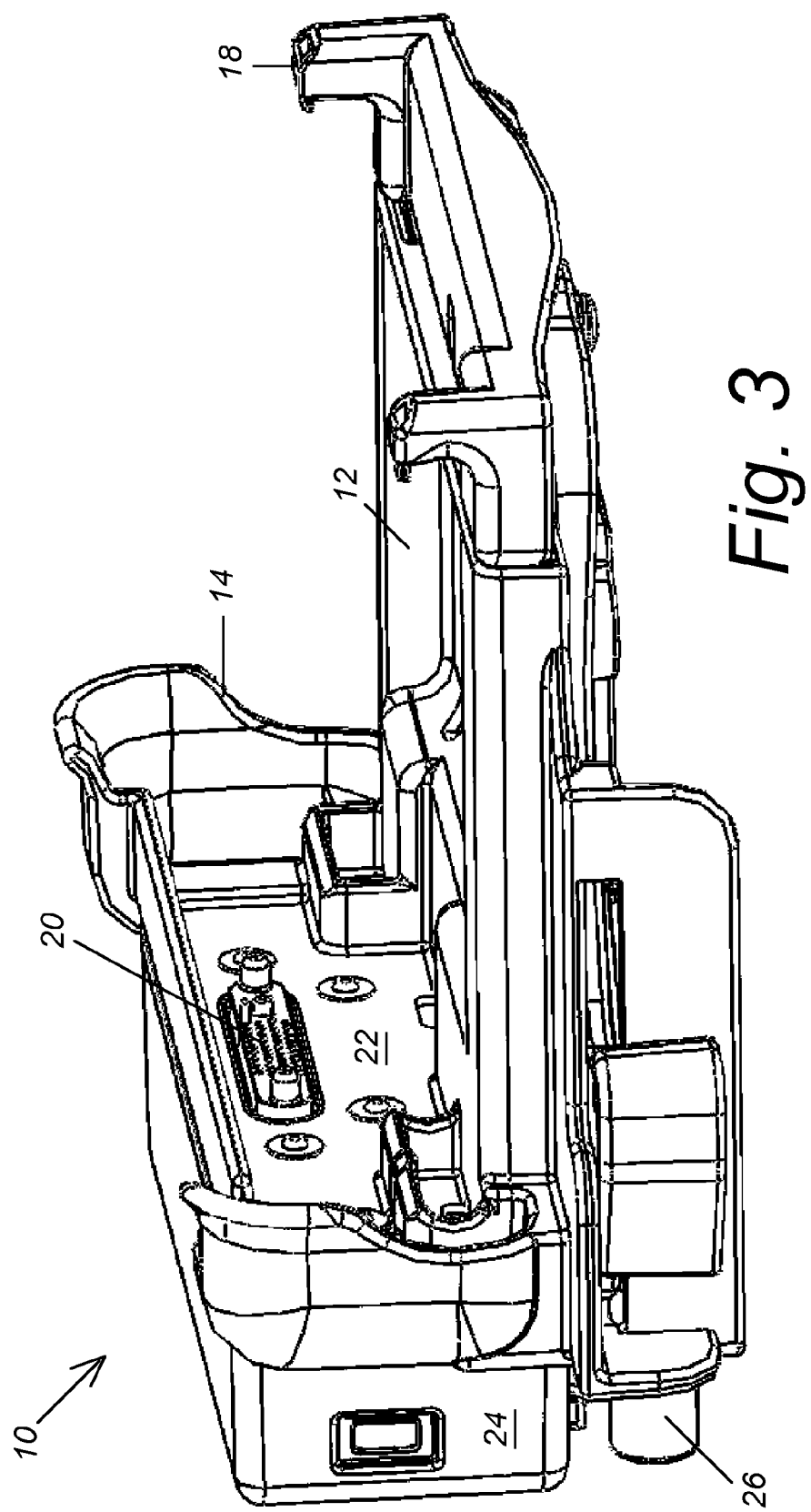
FIG. 3 is another perspective view showing the docking station of FIG. 1 configured in a closed state with the electronic device removed for clarity.

With reference to the Figures, the present invention is a docking station 10 having docking tray 12 formed of a receiver portion 14 for receiving an electronic device 16, such as a portable laptop computer, or other portable electronic device intended to be operated with a docking station, and a clamping portion 18 for securing portable device 16 in mechanical and electrical contact with an extension connector 20 (FIG. 3) positioned in a base portion 22 of receiver portion 14 substantially opposite of clamping portion 18. The extension connector 20 is coupled to an extension module 24 positioned adjacent to base portion 22 of receiver portion 14. Receiver portion 14 also includes a latch mechanism 26, such as but not limited to a lockable latch. Latch mechanism 26 is optionally positioned adjacent to base portion 22 of receiver portion 14 adjacent to one side thereof.

Docking station 10 is operable between an open state (FIG. 1) having clamping portion 18 arranged in an expanded position spaced away from receiver portion 14 for receiving electronic device 16 into base portion 22 of receiver portion 14, and a closed state (FIG. 2) having clamping portion 18 arranged in a retracted position adjacent to receiver portion 14 for retaining electronic device 16 in docking tray 12.

Figure 1:
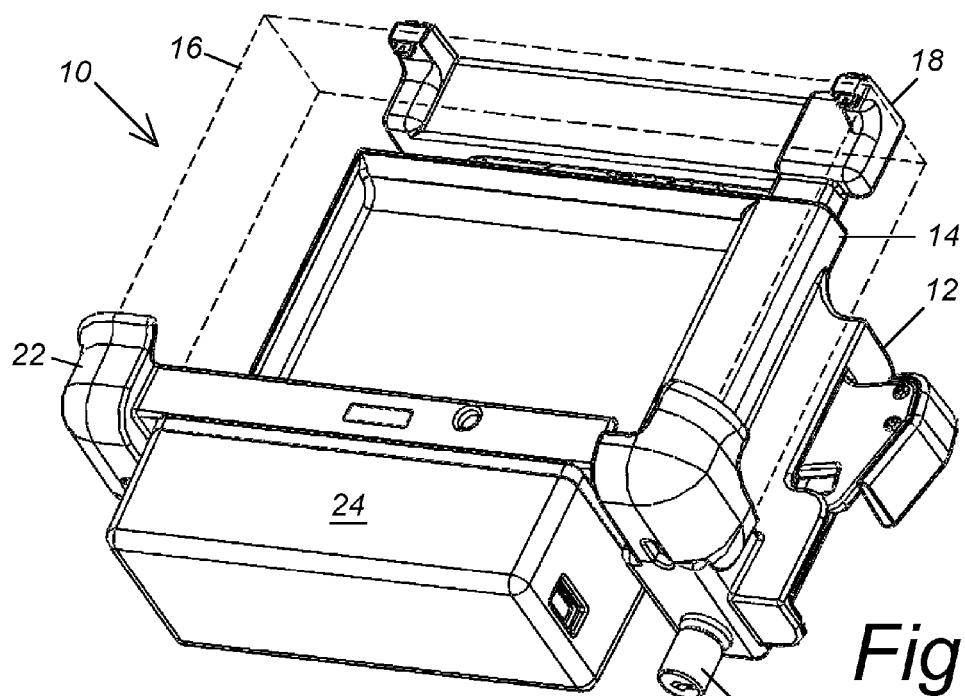
FIG. 1 is a perspective view showing an example of the docking station of the invention configured in an open state for receiving an electronic device.
Figure 4:
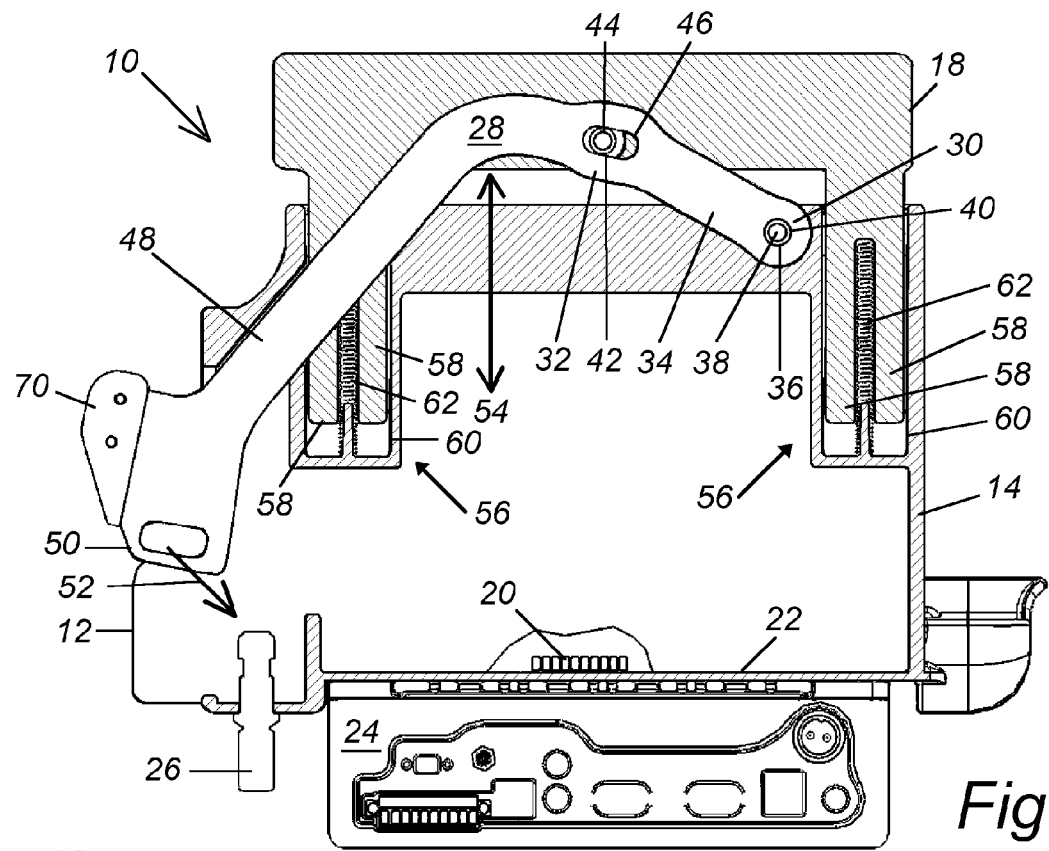
FIG. 4 is a cross-section view of the docking station of FIG. 1 in the open state showing a preload lever coupled between a receiver portion and clamping portion of the docking tray portion.

FIG. 4 illustrates docking station 10 in the open state shown in FIG. 1 having clamping portion 18 arranged in the expanded position spaced away from receiver portion 14 for receiving electronic device 16 into base portion 22 with electronic device 16 engaged with extension connector 20. Here, clamping portion 18 is movably coupled to receiver portion 14, for example, in sliding connection therewith, for moving relative to receiver portion 14 between the open state and the closed state. Clamping portion 18 is movable by operation of a preload lever 28 coupled between receiver portion 14 and clamping portion 18 for driving alternately clamping portion 18 into the expanded position spaced away from receiver portion 14, and the retracted position adjacent to receiver portion 14.

For example but without limitation, preload lever 28 has a fulcrum portion 30 that is rotatably coupled to receiver portion 14 in a pivoting relationship therewith, and a load portion 32 that is coupled to clamping portion 18 in a driving relationship therewith, with a resistance arm 34 interconnecting load portion 32 and fulcrum portion 30. For example, a rotatable coupling 36 is formed of a pin 38 fixed in receiver portion 14 of docking tray 12 rotatably engaged with a mating aperture 40 formed in fulcrum portion 30 of lever 28. A sliding connection 42 is, by example and without limitation, formed as a pin 44 fixed in clamping portion 18 of docking tray 12 and slidingly engaged with a mating slot 46 formed in load portion 32 of lever 28. Load portion 32 structured between preload lever 28 and clamping portion 18 in a position between resistance arm 34 and an effort arm 48 of lever 28, wherein effort arm 48 is coupled for driving load portion 32 relative to fulcrum portion 30.

A latching portion 50 of lever 28 is releasably coupled with receiver portion 14 for retaining clamping portion 18 of docking tray 12 in the retracted position, and simultaneously preloading load portion 32 of lever 28 for compressing clamping portion 18 of docking tray 12 against receiver portion 14. For example, latching portion 50 of lever 28 is an aperture that engages latch mechanism 26 of receiver portion 14 for retaining clamping portion 18 of docking tray 12 against receiver portion 14 when lever 28 is operated (arrow 52) for driving clamping portion 18 along a travel axis (arrow 54) oriented substantially perpendicularly between clamping portion 18 and receiver portion 14.

Figure 2:
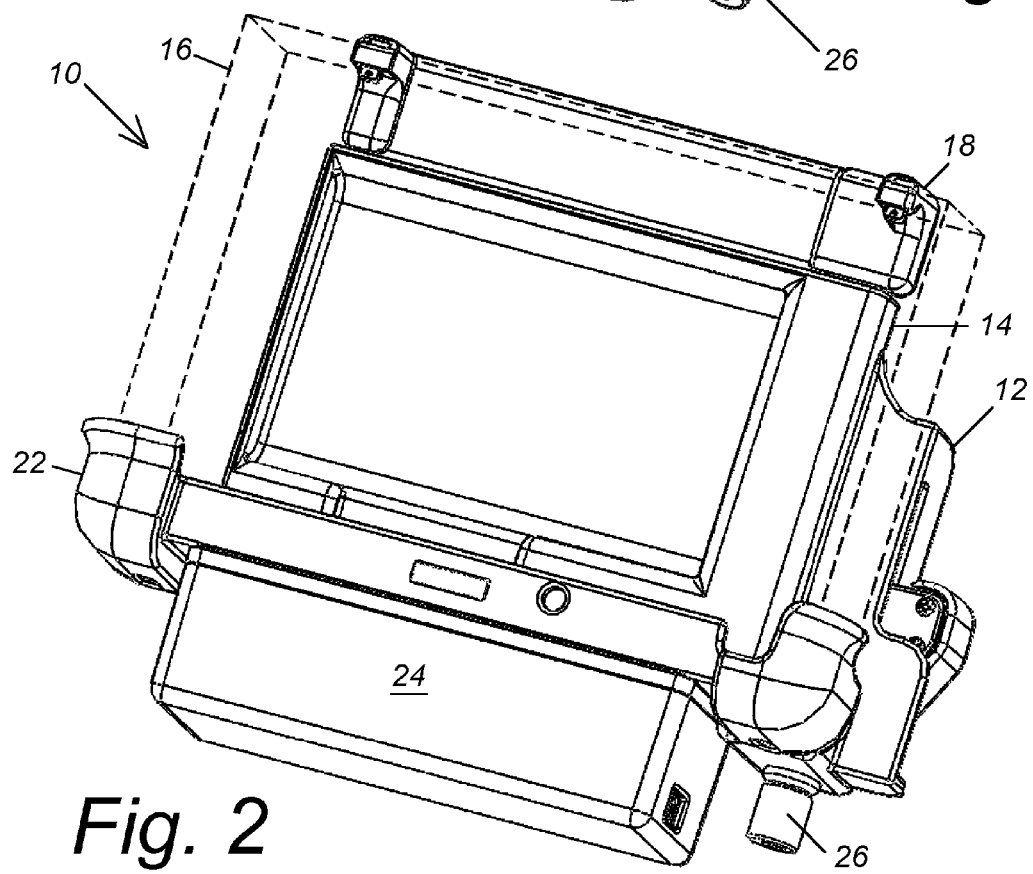
FIG. 2 is a perspective view showing the docking station of FIG. 1 configured in a closed state for retaining the electronic device in a docking tray portion thereof.
Figure 5:
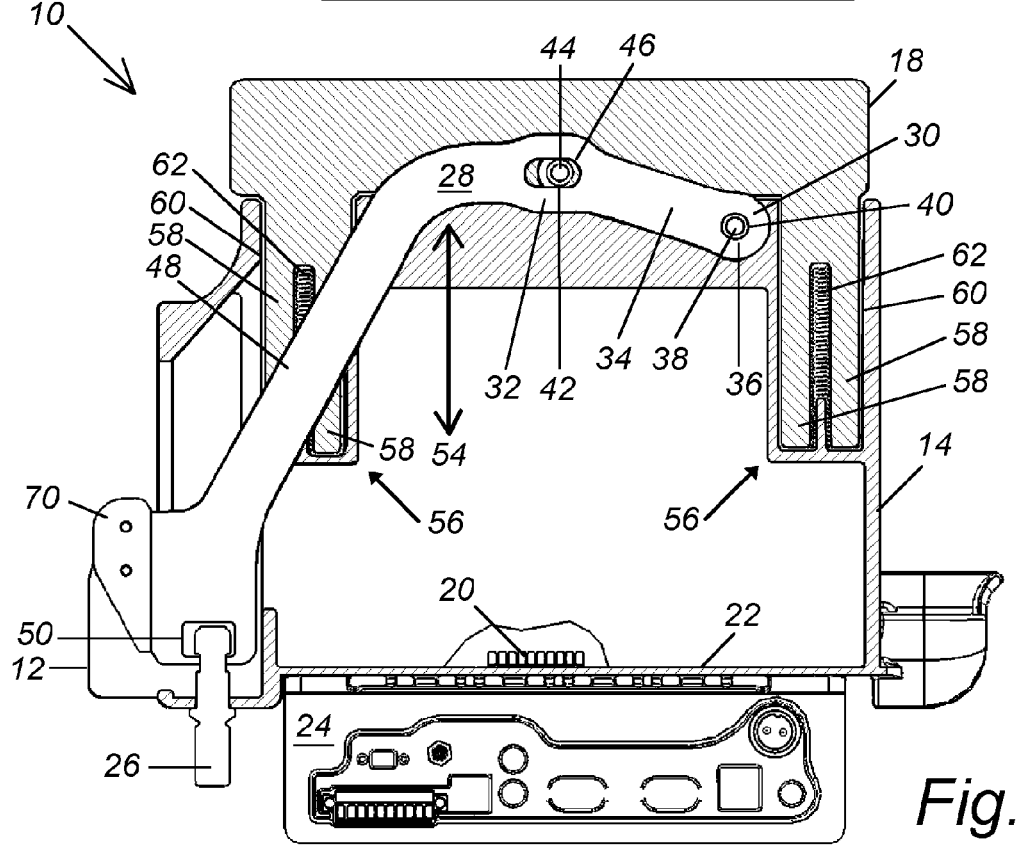
FIG. 5 is another cross-section view of the docking station of FIG. 1 in the closed state showing operation of the preload lever for drawing the clamping portion toward the receiver portion of the docking tray portion.

FIG. 5 illustrates docking station 10 in the closed state of FIG. 2 having clamping portion 18 arranged in the retracted position adjacent to receiver portion 14 for retaining electronic device 16 in docking tray 12, wherein electronic device 16 is removed for clarity.

Optionally, one or more guides 56 are structured between clamping portion 18 of docking tray 12 and receiver portion 14 for guiding clamping portion 18 along travel axis (arrow 54) relative to receiver portion 14. For example, one or more extensions 58 of clamping portion 18 slide in one or more cavities 60 formed in receiver portion 14.

Optionally, clamping portion 18 of docking tray 12 is spring activated relative to receiver portion 14 for substantially automatically expanding docking tray 12 from closed state (FIG. 2) to open state (FIG. 1). For example, a compression spring or other resilient biasing mechanism 62 is positioned between extensions 58 of clamping portion 18 and cavities 60 in receiver portion 14 for urging clamping portion 18 away from receiver portion 14 along travel axis 54.

Figure 6:
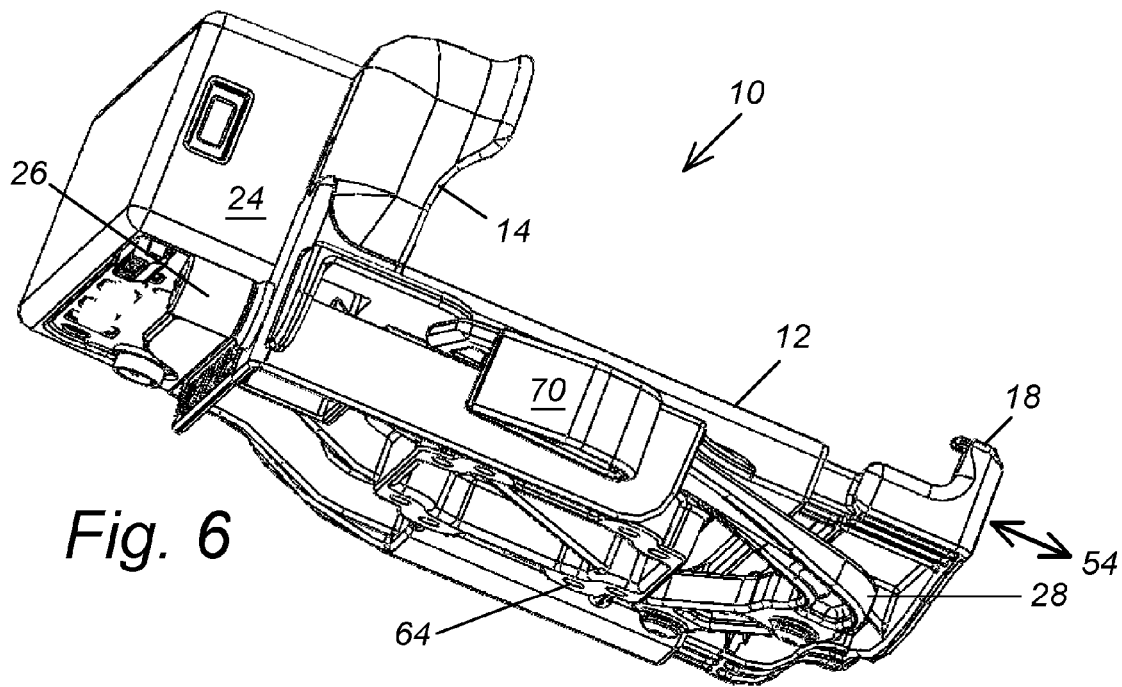
FIG. 6 is a bottom perspective view of the docking station of FIG. 1 showing a mounting structure for mounting the docking station in an automobile or other vehicle.

FIG. 6 illustrates receiver portion 14 of docking tray 12 having a mounting structure 64 for mounting docking station 10 in an automobile or other vehicle.

Figure 7:
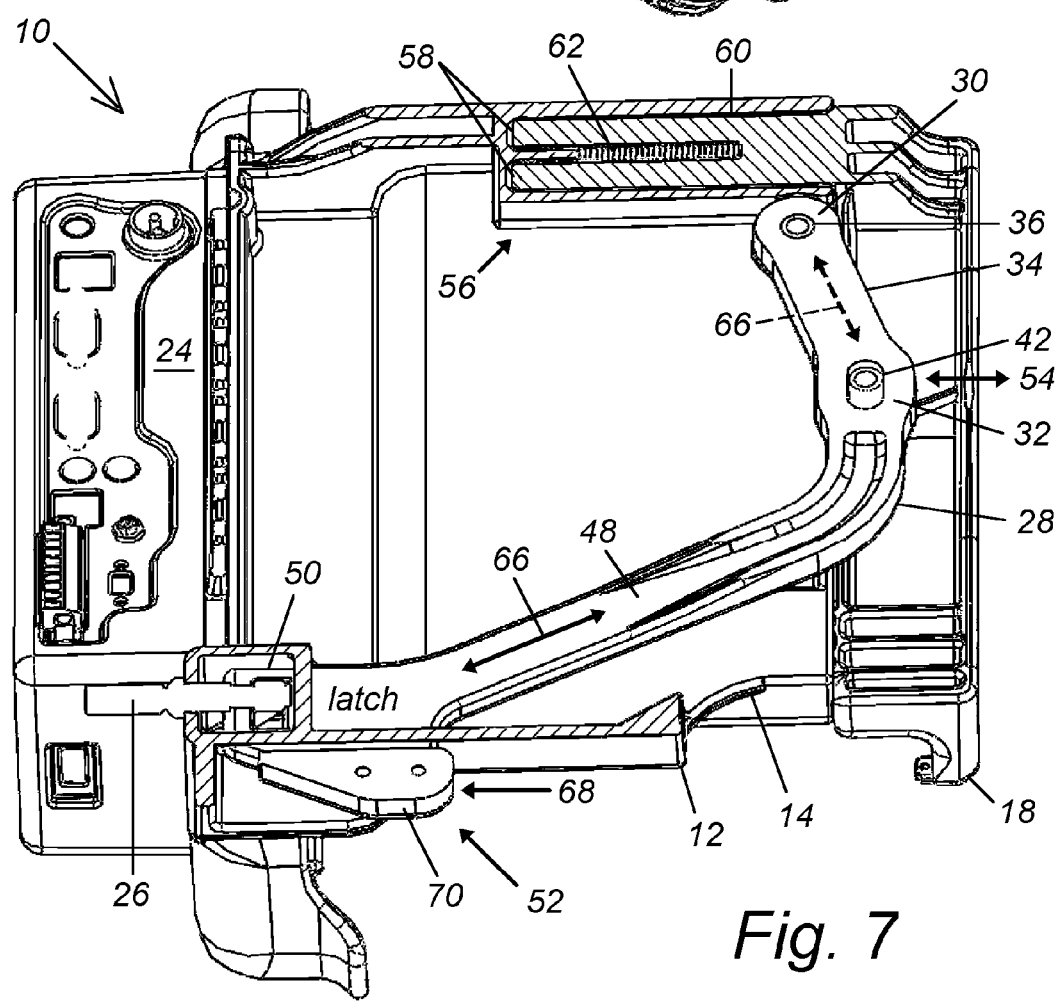
FIG. 7 is another cross-section view of the docking station of FIG. 1 showing the preload lever having a preload portion that is structured for preloading the docking tray 12 in the closed state shown in FIG. 2.

FIG. 7 illustrates lever 28 having a preload portion 66 that is structured for preloading load portion 32 of lever 28 when docking tray 12 is in the closed state (FIG. 2) at least with electronic device 16 installed therein. For example, either one or both of resistance arm 34 and effort arm 48 of lever 28 includes preload portion 66 embodied as a resiliently bendable member for applying a desired preload between clamping portion 18 and receiver portion 14 of docking tray 12 when docking tray 12 is in the closed state with electronic device 16 installed therein, whereby clamping portion 18 is preloaded in the retracted position with electronic device 16 clamped between base portion 22 of receiver portion 14 and clamping portion 18. For example, resiliently bendable member is a plate spring of a desired spring stiffness which is suited to the purpose of maintaining constant electrical contact between portable device 16 and extension connector 20 in base portion 22 of receiver portion 14.

Preferably, resiliently bendable lengthwise portion 66 of lever 28 is included as a portion of effort arm 48 positioned between load portion 32 and latching portion 50 of lever 28. Plate spring lengthwise portion 66 of effort arm 48 is sufficiently stiff to effectively retract clamping portion 18 relative to receiver portion 14 when operated by user, yet is sufficiently flexible for compressing clamping portion 18 of docking tray 12 against receiver portion 14 when docking tray 12 is in the closed state (shown) with electronic device 16 installed therein (FIG. 2).

Preload lever 28 is optionally a second class lever as illustrated having fulcrum portion 30 and latching portion 50 positioned adjacent to opposite ends thereof, with load portion 32 therebetween, similar to a wheelbarrow. Resistance arm 34 is positioned between fulcrum portion 30 and load portion 32, and effort arm 48 is positioned between load portion 32 and latching portion 50. Drive force 68 is applied to a handle 70 of lever 28 positioned adjacent to latching portion 50 at end of effort arm 48 opposite from fulcrum portion 30 and load portion 32.

Optionally, preload lever 28 is a first class lever similar to a see-saw with fulcrum portion 30 positioned between load portion 32 and effort arm 48, with resistance arm 34 positioned between fulcrum portion 30 and load portion 32. Although first class preload lever 28 is configured differently than shown for second class preload lever 28. In still another embodiment, preload lever 28 is a third class lever with fulcrum portion 30 positioned adjacent to a first end and load portion 32 positioned adjacent to the opposite end, with effort arm 48 positioned between fulcrum portion 30 and load portion 32, similar to a baseball bat.

In operation, as docking station 10 is alternately cycled between the open state (FIG. 1) and the closed state (FIG. 2), the fulcrum portion 30 of preload lever 28 is pivotable relative to receiver portion 14 by applying drive force 68 to handle 70 of lever 28. Simultaneously with pivoting of fulcrum portion 30 of preload lever 28, opposing latching portion 50 of preload lever 28 is rotatable (arrow 52) between an unlatched position that is disengaged and spaced away from latch mechanism 26 of receiver portion 14 and corresponds to the open state of docking station 10 having clamping portion 18 arranged in the expanded position thereof, and a latched position that is engaged with latch mechanism 26 and corresponds to the closed state of docking station 10 having clamping portion 18 arranged in the refracted position thereof. During operation (arrow 52) at least preload portion 66 of lever 28 is resiliently bent toward base portion 22 of receiver portion 14 and latch mechanism 26, whereby lever 28 is preloaded in the closed state of docking station 10. Accordingly, substantially constant electrical contact is maintained between portable device 16 and extension connector 20 in base portion 22 of receiver portion 14.

For removal of portable device 16, latching portion 50 of lever 28 is released from latch mechanism 26, whereby resilient preload portion 66 of lever 28 operates for springing latching portion 50 away from latch mechanism 26. When present, resilient biasing mechanism 62 urges clamping portion 18 away from receiver portion 14 along travel axis 54. Else, operator retracts clamping portion 18 away from receiver portion 14 along travel axis 54. Thereafter, portable device 16 is removable from receiver portion 14 of docking tray 12.

While the preferred and additional alternative embodiments of the invention have been illustrated and described, it will be appreciated that various changes can be made therein without departing from the spirit and scope of the invention. Therefore, it will be appreciated that various changes can be made therein without departing from the spirit and scope of the invention. Accordingly, the inventor makes the following claims.

What is claimed is:

1. A docking station, comprising:
a tray comprising a clamping portion coupled to a receiver portion for motion along a travel axis therebetween;
a lever coupled for moving the clamping portion between an expanded position spaced away from the receiver portion, and a retracted position adjacent to the receiver portion,
wherein the lever further comprises a latching portion that is coupled for retaining the clamping portion in the retracted position, and a resilient preload portion adapted for resiliently urging the clamping portion toward the receiver portion in the retracted position.

2. The docking station of claim 1, wherein the lever further comprises:
a fulcrum portion that is coupled to the receiver portion,
a load portion that is coupled to the clamping portion,
a resistance arm interconnecting the load portion and the fulcrum portion, and
an effort arm that is coupled for driving the load portion relative to the fulcrum portion.

3. The docking station of claim 2, wherein the effort arm of the lever further comprises the preload portion thereof.

4. A docking station, comprising:
a tray comprising a clamping portion coupled to a receiver portion for motion along a travel axis therebetween;
a lever coupled for moving the clamping portion between an expanded position spaced away from the receiver portion, and a retracted position adjacent to the receiver portion,
wherein the lever further comprises a latching portion that is coupled for retaining the clamping portion in the retracted position, and a preload portion adapted for resiliently urging the clamping portion toward the receiver portion in the retracted position, and wherein the lever further comprises:
a fulcrum portion that is coupled to the receiver portion,
a load portion that is coupled to the clamping portion,
a resistance arm interconnecting the load portion and the fulcrum portion, and
an effort arm that is coupled for driving the load portion relative to the fulcrum portion, and wherein the resistance arm of the lever further comprises the preload portion thereof.

5. A docking station, comprising:
a tray comprising a clamping portion coupled to a receiver portion for motion along a travel axis therebetween;
a lever coupled for moving the clamping portion between an expanded position spaced away from the receiver portion, and a retracted position adjacent to the receiver portion,
wherein the lever further comprises a latching portion that is coupled for retaining the clamping portion in the retracted position, and a preload portion adapted for resiliently urging the clamping portion toward the receiver portion in the retracted position, and wherein the lever further comprises a second class lever further comprising:
a fulcrum portion that is coupled to the receiver portion,
a load portion that is coupled to the clamping portion,
a resistance arm interconnecting the load portion and the fulcrum portion, and
an effort arm that is coupled for driving the load portion relative to the fulcrum portion.

6. The docking station of claim 5, wherein the preload portion of the lever further comprises a resiliently deflectable member.

7. The docking station of claim 6, wherein the resiliently bendable member of the lever further comprises a spring.

8. The docking station of claim 1, further comprising a guide structured between the clamping portion of the tray and the receiver portion thereof.

9. A docking station, comprising:
a tray comprising a clamping portion coupled to a receiver portion for motion along a travel axis therebetween;
a guide structured between the clamping portion of the tray and the receiver portion thereof;
a lever coupled for moving the clamping portion between an expanded position spaced away from the receiver portion, and a retracted position adjacent to the receiver portion,
wherein the clamping portion is further spring activated relative to the receiver portion for urging the clamping portion from the retracted position to the expanded position, and
wherein the lever further comprises a latching portion that is coupled for retaining the clamping portion in the retracted position, and a preload portion adapted for resiliently urging the clamping portion toward the receiver portion in the retracted position.

10. A docking station, comprising:
a tray comprising a clamping portion coupled to a receiver portion for motion along a travel axis oriented substantially perpendicularly therebetween;
a lever coupled for moving the clamping portion between an expanded position spaced away from the receiver portion along the travel axis, and a retracted position adjacent to the receiver portion, the lever further comprising:
a fulcrum portion that is rotatably coupled to the receiver portion in a pivoting relationship therewith,
a load portion that is coupled to the clamping portion in a driving relationship therewith,
a resistance arm interconnecting the load portion and the fulcrum portion,
an effort arm that is coupled for driving the load portion relative to the fulcrum portion, and
and a latching portion that is coupled for retaining the clamping portion in the retracted position and simultaneously preloading the load portion of the lever, and
wherein one of the effort arm and the resistance arm further comprises a resilient preload portion adapted for preloading the clamping portion in the retracted position.

11. The docking station of claim 10, wherein the lever further comprises a second class lever.

12. The docking station of claim 10, wherein the preload portion further comprises a resiliently bendable member.

13. The docking station of claim 12, wherein the resiliently bendable member further comprises a spring.

14. The docking station of claim 10, further comprising one or more guides structured between the clamping portion of the tray and the receiver portion thereof for guiding the clamping portion along the travel axis relative to the receiver portion.

15. The docking station of claim 14, further comprising a resilient biasing mechanism between the clamping portion and the receiver portion for expanding the clamping portion from the retracted position to the expanded position.

16. A docking station, comprising:
   a tray comprising a clamping portion coupled to a receiver portion for motion along a travel axis oriented substantially perpendicularly therebetween;
   a lever coupled for moving the clamping portion between an expanded position spaced away from the receiver portion along the travel axis, and a retracted position adjacent to the receiver portion and having an electronic device positioned between the clamping portion and a base portion of the receiver portion, the lever further comprising:
      a fulcrum portion that is rotatably coupled in a pivoting relationship with the receiver portion,
      a load portion that is coupled in a driving relationship with the clamping portion,
      a resistance arm interconnecting the load portion and the fulcrum portion,
      an effort arm that is coupled for driving the load portion relative to the fulcrum portion, and
      and a latching portion that is engageable with the receiver portion for retaining the clamping portion in the retracted position and simultaneously preloading the load portion of the lever, and
   wherein at least one of the effort arm and the resistance arm further comprises a resiliently bendable member adapted for preloading the clamping portion in the retracted position with the electronic device positioned between the clamping portion and the base portion of the receiver portion.

17. The docking station of claim 16, wherein the lever further comprises a second class lever.

18. The docking station of claim 16, wherein the resiliently bendable member further comprises a spring.

19. The docking station of claim 16, wherein the spring further comprises a plate spring.

20. The docking station of claim 16, wherein the receiver portion further comprises a mounting structure for mounting the tray in a vehicle.

* * * * *